(12) United States Patent
Pi

(10) Patent No.: US 11,536,473 B2
(45) Date of Patent: Dec. 27, 2022

(54) VERTICAL HUMIDIFIER WITH STEPPED EVAPORATOR

(71) Applicant: Chengdu Aimbon Intelligent Technology Co., Ltd., Chengdu (CN)

(72) Inventor: Tibin Pi, Chengdu (CN)

(73) Assignee: CHENGDU AIMBON INTELLIGENT TECHNOLOGY CO., LTD., CHENGDU (CN)

(*) Notice: Subject to any disclaimer, the term of this patent is extended or adjusted under 35 U.S.C. 154(b) by 220 days.

(21) Appl. No.: 17/121,707

(22) Filed: Dec. 14, 2020

(65) Prior Publication Data
US 2021/0262678 A1   Aug. 26, 2021

(30) Foreign Application Priority Data

Feb. 20, 2020 (CN) .......................... 202010103698.5
Mar. 6, 2020 (CN) .......................... 202010150586.5
Sep. 18, 2020 (CN) .......................... 202010986415.6

(51) Int. Cl.
| | |
|---|---|
| *F24F 6/00* | (2006.01) |
| *B01F 23/21* | (2022.01) |
| *F24F 6/02* | (2006.01) |
| *F24F 8/22* | (2021.01) |
| *F24F 13/24* | (2006.01) |
| *B01D 46/00* | (2022.01) |

(Continued)

(52) U.S. Cl.
CPC .......... *F24F 6/025* (2013.01); *B01D 46/0027* (2013.01); *B01F 23/215* (2022.01); *C02F 1/325* (2013.01); *F24F 6/00* (2013.01); *F24F 6/08* (2013.01); *F24F 8/22* (2021.01); *F24F 13/24* (2013.01); *B01D 2279/50* (2013.01); *C02F 2303/04* (2013.01); *F24F 2006/006* (2013.01); *F24F 2006/008* (2013.01); *F24F 2013/247* (2013.01)

(58) Field of Classification Search
CPC ...... F24F 6/00; F24F 6/08; F24F 6/025; F24F 2006/006; F24F 2006/008; F24F 8/22; B01F 23/215

See application file for complete search history.

(56) References Cited

U.S. PATENT DOCUMENTS 9,776,144 B1 * 10/2017 Lu ........................ F24F 11/0008

FOREIGN PATENT DOCUMENTS

CN         100478623 C  *  4/2009   ................ F24F 6/02

* cited by examiner

*Primary Examiner* — Robert A Hopkins
(74) *Attorney, Agent, or Firm* — Bayramoglu Law Offices LLC

(57) ABSTRACT

A vertical humidifier with a stepped evaporator includes a housing. An evaporative water trough is provided inside the housing, and the stepped evaporator is provided in the evaporative water trough. A fan is mounted under the stepped evaporator, and an air inlet end of the fan is communicated with an air inlet of the housing. A water tank is further mounted at the upper portion of the evaporative water trough, the stepped evaporator is mounted around the lower portion of the water tank, and the water tank is further communicated with the evaporative water trough through a water inlet. An air outlet is provided at the upper portion of the housing, and the air outlet is communicated with an air outlet end of the fan. The stepped evaporator is arranged in an airflow channel between the air outlet and the air outlet end of the fan.

15 Claims, 6 Drawing Sheets

(51) Int. Cl.
*C02F 1/32* (2006.01)
*F24F 6/08* (2006.01)

VERTICAL HUMIDIFIER WITH STEPPED EVAPORATOR

CROSS REFERENCE TO THE RELATED APPLICATIONS

This application is based upon and claims priority to Chinese Patent Applications No. 202010103698.5, filed on Feb. 20, 2020; No. 202010150586.5, filed on Mar. 6, 2020; and No. 202010986415.6, filed on Sep. 18, 2020; the entire contents of which are incorporated herein by reference.

TECHNICAL FIELD

The present invention relates to an evaporative humidifier, and more particularly, to a vertical humidifier with a stepped evaporator.

BACKGROUND

In an evaporative humidifier, airflow is generated by a fan. When the airflow passes through an evaporator, liquid water adhering to the evaporator is evaporated and discharged together with the airflow, so as to keep the indoor air humid. Since the fan is required to be driven by a motor and is mounted above a housing of the humidifier, the fan rotates to form negative pressure in the housing to generate the airflow. The motor also generates noise during operation, and therefore, sealing design requirements for the housing are imposed to dampen acoustics. Meanwhile, the rotational speed of the fan is limited due to the noise problem, thus limiting optimal humidification produced by the humidifier. The humidifier with such structure typically has an underlaid water tank. The airflow enters the humidifier from an air inlet on the housing and then is discharged out of the top through an air channel. In order to ensure the airflow fully contacts the evaporator, the shape of the air channel must be curved, which obstructs the airflow to a certain degree, thereby increasing the noise during operation of the humidifier. Moreover, since the water tank is arranged at the lower portion of the fan and the air channel is curved, the design form influences the overall aesthetics of the product and imposes dictates on the volume of the humidifier. Therefore, it is highly desirable to provide an improved evaporative humidifier.

SUMMARY

In view of the above shortcomings, an objective of the present invention is to provide a vertical humidifier with a stepped evaporator, so as to solve the technical problems of noise generation, inefficient humidification and waste of interior volume impacting overall aesthetics of humidifiers heretofore available.

In order to solve the technical problems mentioned above, the present invention adopts the following technical solution.

The present invention provides a vertical humidifier with a stepped evaporator, which includes a housing. An evaporative water trough is provided inside the housing, and the evaporator is provided and immersed in the evaporative water trough. A fan is mounted under the evaporator, and an air inlet end of the fan is communicated with an air inlet of the housing. A water tank is further mounted at the upper portion of the evaporative water trough, and the water tank is communicated with the evaporative water trough through a water inlet. An air outlet is provided at the upper portion of the housing, and the air outlet is communicated with an air outlet end of the fan. The evaporator is arranged in an airflow channel between the air outlet and the air outlet end of the fan, and the airflow channel is located between the inner wall of the housing and the outer wall of the water tank.

Preferably, further, the water tank has a T-shaped longitudinal section, and the upper portion of the water tank is greater than the lower portion of the water tank. The upper portion of the evaporator is mounted around the lower portion of the T-shaped water tank, and the lower portion of the evaporator is immersed into the evaporative water trough.

Further, the evaporator is cylindrical and is mounted around the lower portion of the water tank, and a transverse profile area of the upper portion of the evaporator is greater than a transverse profile area of the lower portion of the evaporator. The evaporator is formed by folding fiber layers, and a folding density of the lower portion of the evaporator is greater than a folding density of the upper portion of the evaporator.

Further, a tapered surface is provided at the inner side of the upper portion of the evaporator, and the tapered surface is matched with the outer wall of the water tank. An annular step surface is provided at the outer side of the lower portion of the evaporator. The upper portion of the evaporator is clamped at the upper edge of the evaporative water trough.

Further, a valve is mounted in the evaporative water trough, and the valve corresponds to the water inlet and is configured to control a water quantity entering the evaporative water trough from the water inlet.

Further, a cover is provided at the top of the housing, the water tank is arranged directly under the cover, and the air outlet is arranged on the outside of the edge of the cover.

Further, the fan includes a blade and a motor, and the motor is drivingly connected to the blade. The motor is arranged above the blade, and the motor is arranged in a cavity protruding upwards at the middle of the evaporative water trough.

Further, the water tank, the evaporator, the evaporative water trough and the fan are sequentially mounted in the housing longitudinally, and the water tank, the evaporator, the evaporative water trough and the fan are concentrically arranged and share a common axis.

Further, an ultraviolet sterilizing lamp is further mounted inside the evaporative water trough.

Further, a water heating device is mounted at the lower portion of the evaporative water trough.

Further, the air inlet is arranged at the bottom of the housing. An air heating device is further mounted at the bottom of the housing, and the air heating device is arranged between the air inlet and the air outlet end of the fan.

Further, a primary filter screen is mounted on the air inlet.

Compared with the prior art, the present invention has the following advantages. The fan is mounted under the lower portion of the evaporator, and the air inlet is additionally provided at the lower portion of the housing, so that the noise generated by the motor of the fan in the operation process is blocked and absorbed by the evaporator in the process of passing through the evaporator along with air, thereby effectively reducing the noise generated when the humidifier operates, and therefore, the humidification amount in unit time may be increased by increasing the rotational speed of the fan.

The airflow channel is arranged between the housing and the outer wall of the water tank, and the evaporator is mounted around the lower portion of the water tank, so as to form a longitudinal airflow channel, so that the airflow flows in a direction perpendicular to the horizontal plane. In this way, the length of an airflow passage is shortened, obstruction of the airflow by the airflow channel is reduced, and noise is effectively dampened when passing through the evaporator, thereby realizing silence. The stepped evaporator with a compact lower end and a sparse upper section may also improve the turbulence and mass transfer effects of the airflow, thereby effectively increasing the humidification amount.

The volume of the humidifier is further reduced by the vertical design, and the large-capacity water tank can also be ensured on the basis of the compact structure. In addition, the integral aesthetics of the humidifier may be further improved in conjunction with the lower air inlet, and meanwhile, the vertical humidifier with the stepped evaporator according to the present invention has a simple structure, and thus is suitable for industrial production and easy to popularize.

In the figures, 1: housing, 2: evaporative water trough, 3: evaporator, 31: tapered surface, 32: annular step surface, 4: fan, 5: air inlet, 6: water tank, 7: air outlet, 8: water inlet, 9: valve, 10: cover, 11: airflow channel, 12: water heating device, 13: motor, and 14: air heating device.

DETAILED DESCRIPTION OF THE EMBODIMENTS

The present invention will be further described below with reference to the drawings.

Figure 1:
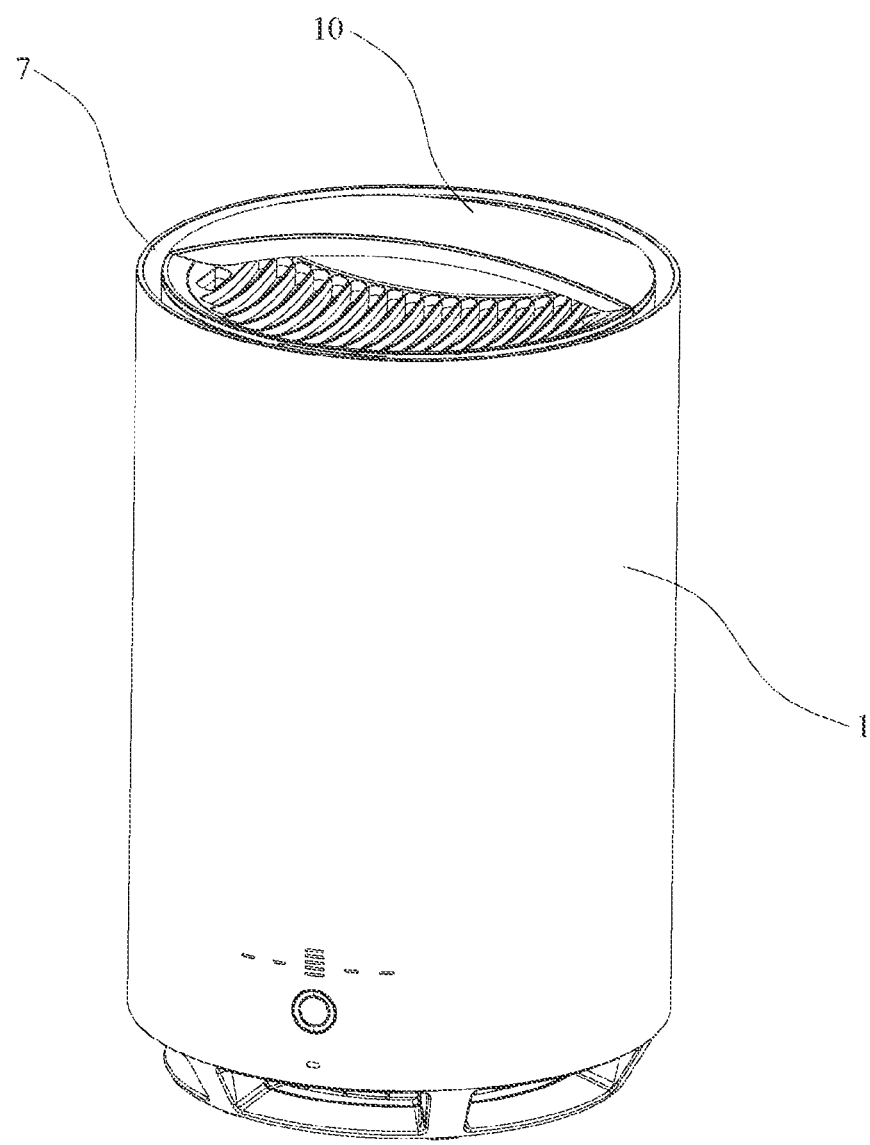
FIG. 1 is a schematic diagram of the structure of a vertical humidifier according an embodiment of the present invention.
Figure 2:
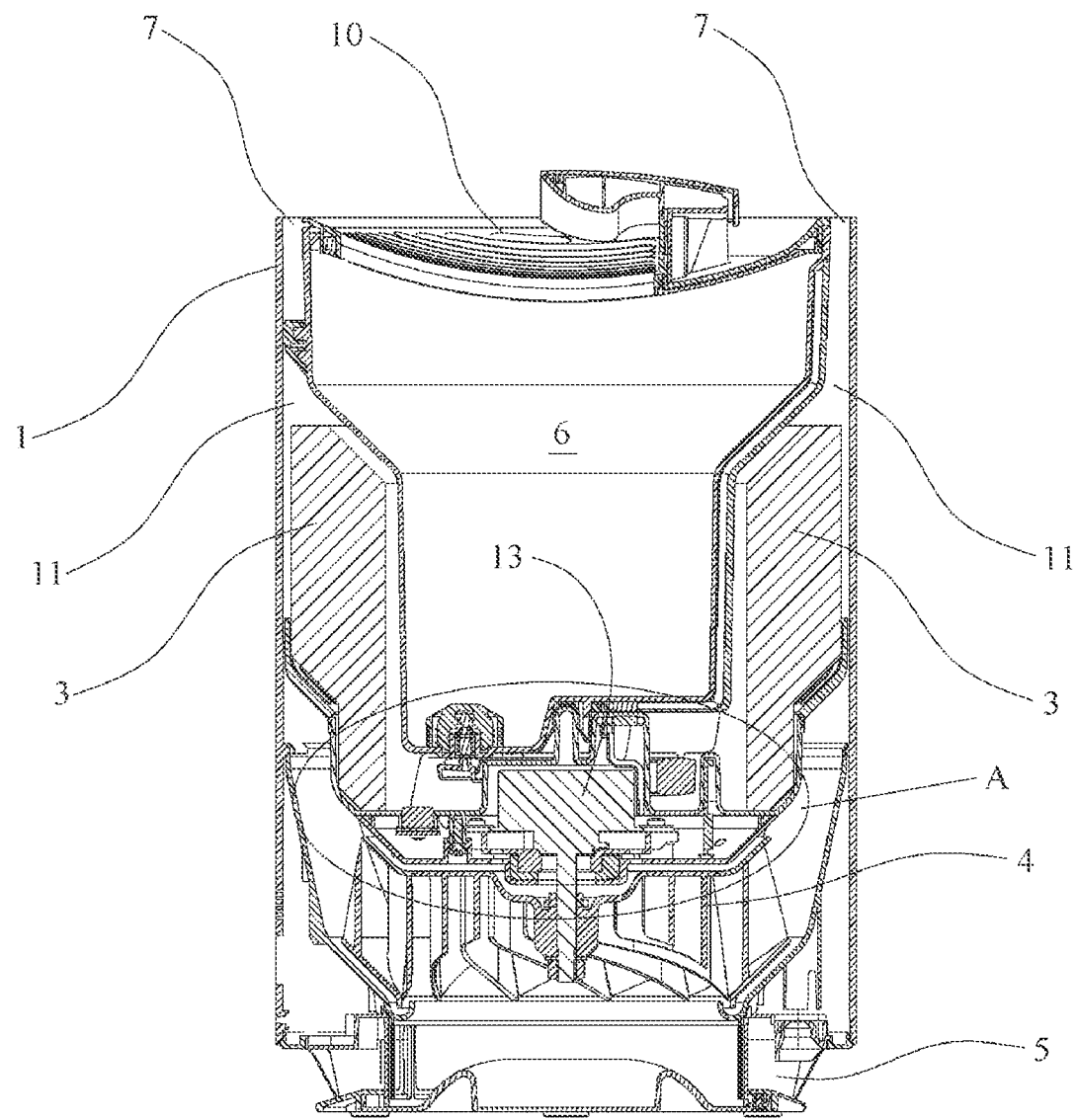
FIG. 2 is a longitudinal sectional view of FIG. 1.
Figure 3:
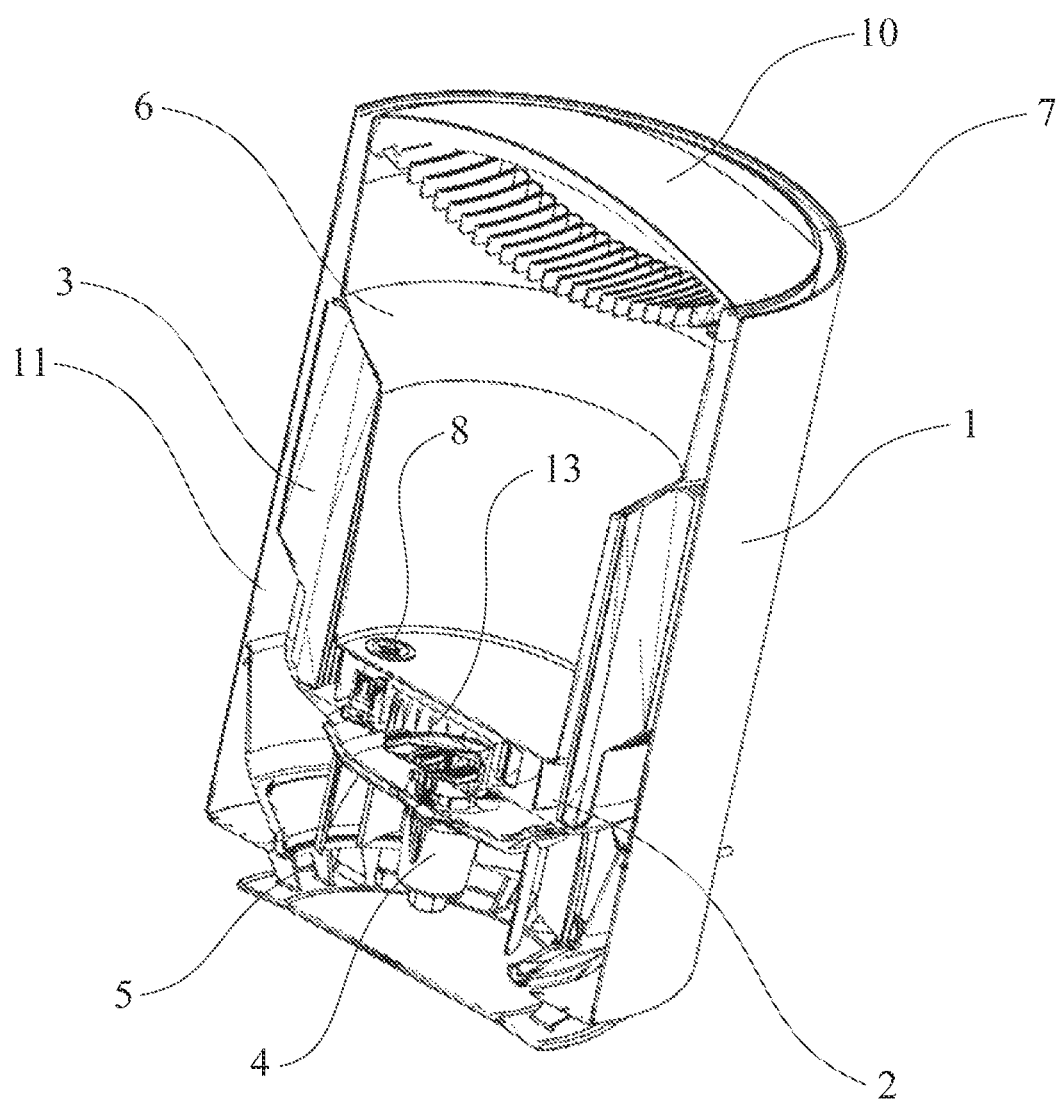
FIG. 3 is an axial side view of FIG. 2.

Referring to FIGS. 1 and 2, according to an embodiment of the present invention, a vertical humidifier with a stepped evaporator includes the housing 1. The evaporative water trough 2 is provided inside the housing 1 and preferably shaped as a ring to facilitate placement of the evaporator 3 in the evaporative water trough 2. The evaporator 3 is configured to absorb the water in the evaporative water trough 2 according to a capillary principle, and then, the water is evaporated under the action of airflow. Therefore, the fan 4 is further required to be mounted under the evaporator 3, for example, the fan 4 may be arranged at the bottom portion of the housing 1 as shown in FIGS. 2 and 3, and an air inlet end of the fan 4 is communicated with the air inlet 5 of the housing 1. Furthermore, the water tank 6 is further required to be mounted at the upper portion of the evaporative water trough 2, and the water tank 6 is configured to store water. The water tank 6 is communicated with the evaporative water trough 2 through the water inlet 8, so that the water stored in the water tank 6 may flow into the evaporative water trough 2 to be absorbed by the evaporator 3. Additionally, the air outlet 7 is further required to be provided at the upper portion of the housing 1, and the air outlet 7 is communicated with the air outlet end of the fan 4. The evaporator 3 may be directly arranged in the airflow channel 11 between the air outlet 7 and the air outlet end of the fan 4. The airflow channel 11 is located between the inner wall of the housing 1 and the outer wall of the water tank 6, that is, the annular airflow channel 11 is formed by the inner wall of the housing 1 and the outer wall of the water tank 6. When the fan 4 rotates to generate the airflow, the airflow first passes through the evaporator 3 before being discharged from the air outlet 7, so that the liquid water at the evaporator 3 is evaporated into water molecules which are discharged out of the air outlet 7 along with the airflow, thereby achieving air humidification. In order to ensure the compactness of the structure of the humidifier without affecting the air inlet at the lower portion of the housing 1, a motor of the fan 4 is mounted in the housing 1 and arranged above the fan 4, and then the motor 13 is drivingly connected to the blades of the fan. Based on the foregoing description, it can be seen that in the structure of the humidifier according to the present embodiment, the evaporator 3 is arranged in the evaporative water trough 2 and arranged between the fan 4 and the water tank 6.

In order to further save the space in the housing 1, as mentioned above, the evaporative water trough 2 may be shaped as the ring. On this basis, an upward protrusion may be provided at the middle of the evaporative water trough 2, and a cavity is formed in the protrusion, so that the motor 13 may be mounted in the cavity, thereby effectively utilizing the space between the cylindrical evaporator 3 and the evaporative water trough 2.

Preferably, the water tank 6, the evaporator 3, the evaporative water trough 2 and the fan 4 mentioned above may be sequentially mounted in the housing 1 longitudinally as shown in FIG. 2, and the water tank 6, the evaporator 3, the evaporative water trough 2 and the fan 4 are concentrically arranged and share a common axis, so as to further control the overall volume of the humidifier to really achieve an ultra-small volume but have a large-capacity water tank, which makes the structure of the humidifier compact.

In an embodiment, the fan 4 is mounted under the evaporator 3, and the air inlet 5 is additionally provided at the lower portion of the housing 1, so that the noise generated by the motor 13 of the fan 4 in the operation process may be blocked and absorbed by the evaporator 3, thereby effectively reducing the noise generated when the humidifier operates. After the applicant performs a test on a prototype in a laboratory, the noise is lower than 25 dB when the humidification amount is 200 ml/h, and therefore, the humidification amount in unit time may be increased by increasing the rotational speed of the fan. Moreover, the airflow channel 11 is arranged between the housing 1 and the outer wall of the water tank 6, and the evaporator 3 is mounted around the lower portion of the water tank 6, so as to form the longitudinal airflow channel 11 to reduce obstruction of the airflow by the airflow channel 11. In this way, the volume of the humidifier is further reduced to make the structure of the humidifier more compact, and the overall aesthetics of the humidifier may be improved in conjunction with the lower air inlet 5.

Still referring to FIG. 2, in a more preferred embodiment of the present invention for solving the technical problems, in order to optimize the structure of the above-mentioned airflow channel 11 and reserve enough space for the evaporator 3, the above-mentioned water tank 6 may be directly designed to have a structure with a T-shaped longitudinal section. As shown in FIG. 2, the upper portion of the water tank 6 is greater than the lower portion of the water tank 6, so that the evaporator 3 may be mounted around the lower portion of the water tank. As shown in the FIG. 2, the evaporator 3 may also be designed to have a T-shaped cylindrical structure, and when the evaporator 3 is mounted around the lower portion of the water tank 6, the cylindrical evaporator 3 is engaged with the lower portion of the water tank 6, and the lower portion of the evaporator 3 is submerged into the evaporative water trough 2. Based on the foregoing structure, the water tank 6 may be preferably designed to have a structure with a circular cross section, and the evaporator 3 may be designed to a cylindrical shape. In order to save space, the evaporator 3 may be mounted around the lower portion of the water tank 6, and the transverse profile area of the upper portion of the evaporator 3 is greater than the transverse profile area of the lower portion of the evaporator 3. The evaporator 3 is formed by folding fiber layers, and the folding density of the lower portion of the evaporator 3 is greater than the folding density of the upper portion of the evaporator 3. By means of the structure of the evaporator 3 with a sparse upper portion and a compact lower portion, the unfolded volume of the upper portion of the evaporator is greater than the volume of the lower portion of the evaporator which is relatively compact. In this way, the water in the evaporative water trough 2 may smoothly submerge the evaporator 3 from bottom to top, and most impurities in the water are filtered by the portion with the large folding density at the lower portion of the evaporator 3 in the process that the water in the evaporative water trough enters the evaporator 3 from bottom to top according to a capillary phenomenon, thereby improving the cleanliness of the water entering the upper portion of the evaporator 3, and avoiding that the impurities in the water are evaporated along with the airflow to enter air. By means of the mentioned-above structure of the evaporator 3 with the sparse upper portion and the compact lower portion, the airflow channel 11 may be fully distributed at the upper portion of the evaporator 3, so that the airflow inevitably passes through the evaporator 3, and the wet evaporator 3 adsorbs and cleans the air passing through the airflow channel 11 when the liquid water on the evaporator 3 is evaporated, that is, the evaporator 3 may adsorb small particles in the air. Based on the aforesaid same idea, a primary filter screen may be further mounted on the air inlet 5 of the housing 1, and large particles in the air may be filtered by the primary filter screen, thereby cooperating with the adsorptive effect of the evaporator 3.

Meanwhile, the stepped structure of the evaporator 3 with the large upper portion and the small lower portion may reduce the position occupied by the lower portion of the evaporator 3 in the evaporative water trough 2, and then reduce the width of the evaporative water trough 2, thus widening the airflow channels at the two sides of the evaporative water trough 2, and further improving the utilization rate of the space inside the housing 1. The evaporator with the stepped structure mentioned above has a small lower end with a large density and compact folded layers and a large upper end with a small density and sparse folded layers. The fan is mounted under the lower portion of the evaporator, so that noise may be effectively dampened and eliminated after passing through the evaporator, thereby realizing silence. The stepped evaporator with the compact lower end and the sparse upper section may also improve the turbulence and mass transfer effects of the airflow, so that the liquid water on the evaporator may be easily evaporated into water molecules. After the applicant performs a test on the prototype in the laboratory, the evaporative amount of the humidifier is increased from 283 ml/h to 435 ml/h after the evaporator with the stepped structure is adopted. Meanwhile, as mentioned above, the folded layers at the lower small end of the evaporator may easily intercept the impurities in the water to prevent the impurities from being evaporated along with the liquid water.

Figure 5:
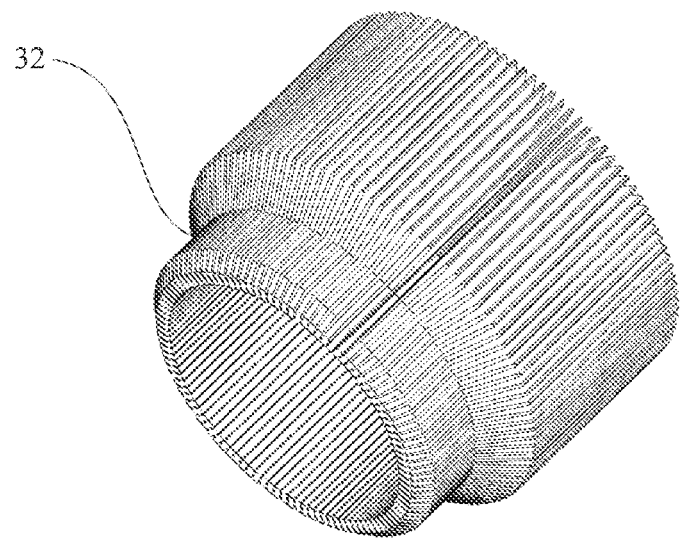
FIG. 5 is a schematic diagram of the structure of an evaporator according to another embodiment of the present invention.
Figure 6:
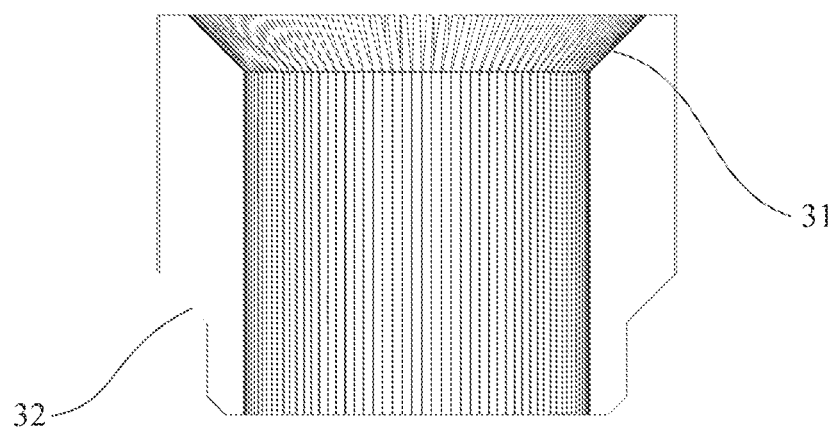
FIG. 6 is a sectional view of FIG. 5.

Further, as shown in FIGS. 5 and 6, in order to increase the engagement degree between the evaporator 3 and the water tank 6, in an embodiment, the tapered surface 31 is provided at the inner side of the upper portion of the evaporator 3, so that the tapered surface 31 may be matched with the outer wall of the water tank 6. Further, in order to ensure the stability of the evaporator 3 in the evaporative water trough 2 during the mounting process, the annular step surface 32 may be further provided at the outer side of the lower portion of the evaporator 3. The lower end of the evaporator 3 may be arranged in the evaporative water trough 2 by the annular step surface 32, and the upper portion of the evaporator 3 is configured to be clamped at the evaporative water trough 2. The annular step surface 32 forms a right angle at the longitudinal section of the evaporator 3 to ensure the stability of the evaporator 3 clamping at a notch of the evaporative water trough 2.

Figure 4:
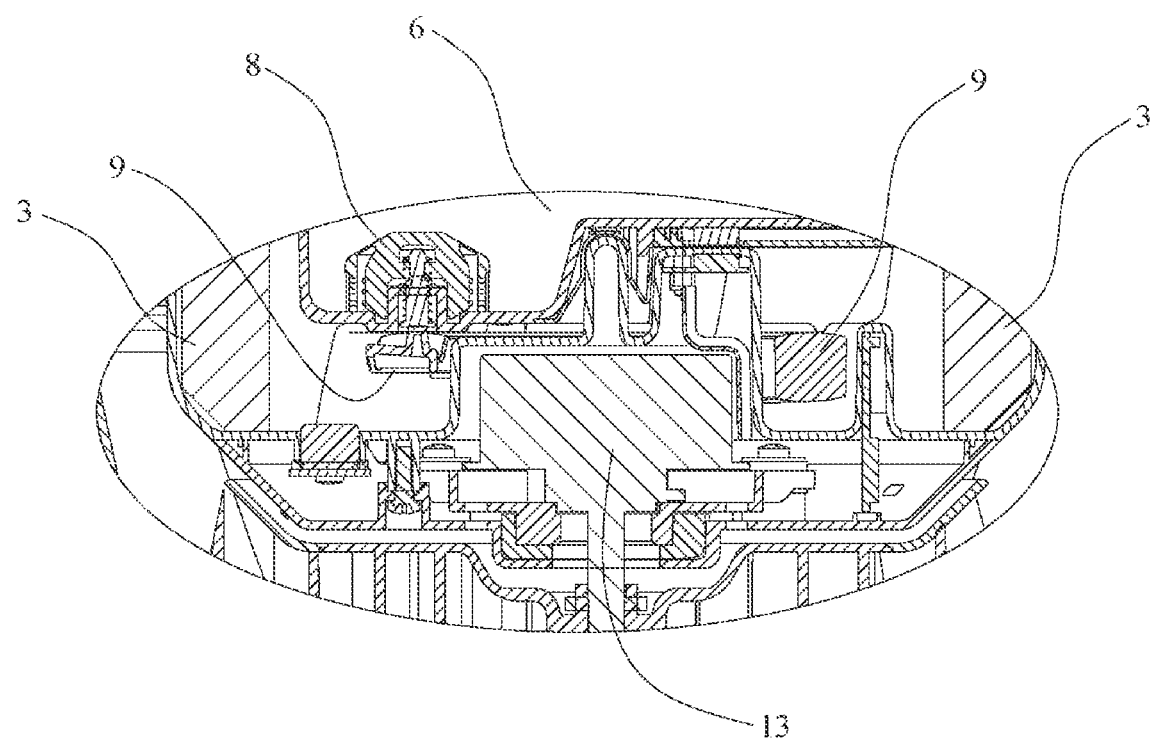
FIG. 4 is an enlarged view of the portion A circled in FIG. 2.

On the other hand, as shown in FIG. 4, in order to avoid the overflow caused by the excessive amount of water in the evaporative water trough 2, the valve 9 may be further mounted in the evaporative water trough 2. One end of the valve 9 corresponds to the position of the water inlet 8, and a sealable rubber plug is mounted at the water inlet 8, so that sufficient amount of water may be always maintained in the evaporative water trough 2 by the valve 9. The principle of a float plug valve is utilized in the valve 9, that is, when the evaporative water trough 2 already has a rated amount of water, a floater floats upwards, the water inlet 8 is closed by the rubber plug at this time, and when the evaporative water trough 2 has an insufficient amount of water, the floater descends, and the rubber plug at the water inlet is jacked up by the other end of the valve 9 to open the water inlet 8, so that the amount of the water in the evaporative water trough 2 is always maintained to be constant, and thus, the humidification amount is maintained to be constant without being affected by the level of the water stored in the water tank 6.

Further, for convenient water addition, the cover 10 may be further mounted at the top of the housing 1, and the water tank 6 is arranged directly under the cover 10. Water may be added into the water tank 6 after opening the cover 10 or through a through hole at the cover 10. In an embodiment, the air outlet 7 mentioned above may be arranged on the outside of the edge of the cover 10.

Figure 7:
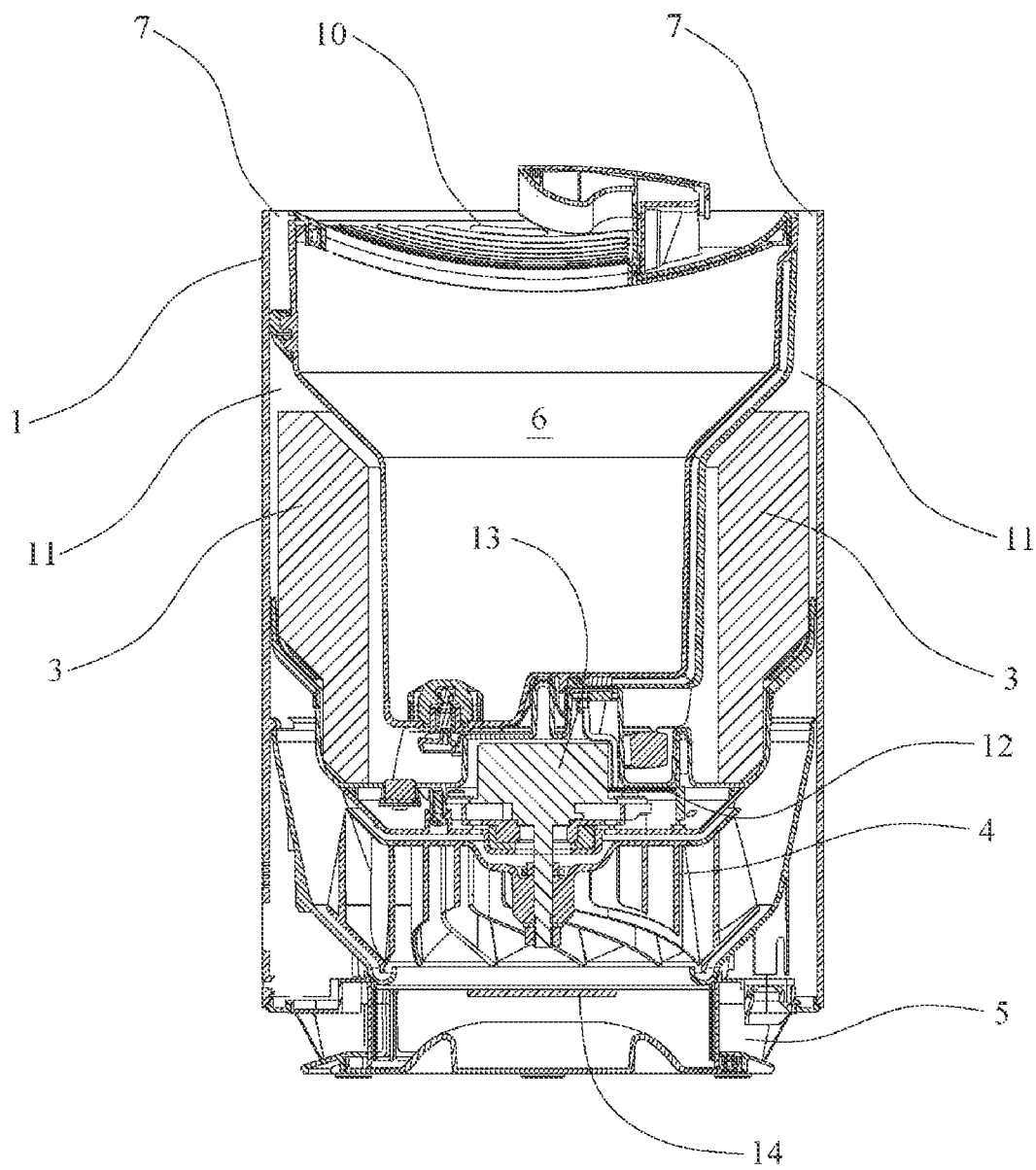
FIG. 7 is a schematic diagram of the structure of a vertical humidifier according still another embodiment of the present invention.

On the other hand, in order to suppress bacteria in the water in the humidifier, as a preferred structure in the above-mentioned embodiments, an ultraviolet sterilizing lamp may be further mounted inside the evaporative water trough 2. As shown in FIG. 7, in an embodiment, in order to improve the humidification efficiency of the humidifier, the water heating device 12 is further mounted at the lower portion of the evaporative water trough 2, and the heating portion of the water heating device 12 contacts the bottom of the evaporative water trough 2, so as to heat the water in the evaporative water trough by means of heat transfer to increase the evaporative amount of the water passing through the evaporator 3. According to experimental data of the inventor, when the temperature of the water on the evaporator 3 rises, the evaporative amount of the water is increased significantly. According to a conventional test standard, in an environment with the air temperature of 23°

C.±5° C., the indoor humidity is 30%±5%, the evaporative amount is 400 ml/h at this time, and when the temperature of the water on the evaporator 3 reaches 35° C., the evaporative amount is 600 ml/h, and when the temperature of the water reaches 38° C., the evaporative amount is 900 ml/h. Therefore, by controlling the power and heating time of the water heating device 12, the water in the evaporative water trough 2 may be always maintained in the temperature interval of 30° C.-39° C., thereby increasing the humidification amount.

Further, the inventor has found through experiments that the humidification amount may be increased by not only increasing the temperature of the water but also increasing the temperature of the inlet air. In view of this, the air inlet 5 may be arranged at the bottom of the housing 1, and then, the air heating device 14 is mounted at the bottom of the housing 1 and arranged between the air inlet 5 and the air inlet end of the fan 4. When the fan 4 rotates, the external airflow enters the humidifier from the air inlet 5, is heated by contacting the air heating device 14, and then enters the airflow channel 11 to contact the evaporator 3, thereby increasing the humidification amount. The water heating device 12 and the air heating device 14 may separately heat the water and the airflow by means of a resistor or an electromagnetic coil, which is not described in detail herein.

Referring to FIG. 4, in the above-mentioned preferred embodiment of the present invention, in practical use, when power is provided, the fan 3 starts to rotate, and the external air enters the airflow channel 11 from the air inlet 5 at the bottom of the housing 1, contacts the evaporator 3 in the airflow channel 11, and is then discharged out of the air outlet 7 at the upper portion of the housing 1, thereby forming the airflow inside the housing 1. In this process, the airflow enters the humidifier from the lower portion of the housing 1 and is discharged out of the upper portion of the housing 1, that is, the airflow flows from bottom to top in a direction perpendicular to the horizontal plane. The water inlet 8 is opened by the valve 9 in the evaporative water trough 2 to enable the water in the water tank 6 to flow into the evaporative water trough 2. When the liquid level of the evaporative water trough 2 reaches a rated line, the water inlet 8 is closed by the valve 9 according to the principle of the float plug valve, the lower portion of the evaporator 3 is immersed in the water in the evaporative water trough 2 at this time, and the liquid water permeates upwards gradually in the fiber layers according to the capillary phenomenon. Under the action of the airflow, the liquid water on the evaporator 3 is evaporated and then continuously discharged through the air outlet 7. The aforementioned process continues when the fan 3 continuously rotates, thereby increasing the humidity in the surrounding air. When the water is required to be added, the water may be directly poured on the cover 10 and then flow into the water tank through the through hole at the cover 8, or may be added into the water tank 6 by opening the cover 10.

In addition to the foregoing, it should be noted that reference throughout this specification to "one/an embodiment", "another embodiment", "embodiment", or the like, means that a specific feature, structure, or characteristic described in connection with the embodiment is included in at least one embodiment described generally in this application. The appearances of the same phrase in various places in the specification are not necessarily all referring to the same embodiment. Further, when a specific feature, structure, or characteristic is described in connection with any embodiment, such feature, structure, or characteristic implemented in connection with other embodiments shall fall within the scope of the invention.

Although the invention has been described with reference to a number of illustrative embodiments thereof, it should be understood that numerous other modifications and implementations may be made by those skilled in the art, and these modifications and implementations shall fall within the scope and spirit of the principles of the present invention. More specifically, various transformations and improvements may be made in the component parts and/or layouts of the subject combination arrangement within the scope of the present invention, the drawings and the appended claims. In addition to transformations and improvements in the component parts and/or arrangements, other uses will be still apparent to those skilled in the art.

What is claimed is:

1. A vertical humidifier with a stepped evaporator, comprising a housing, wherein an evaporative water trough is provided inside the housing, and the stepped evaporator is provided and immersed in the evaporative water trough; a fan is mounted under the stepped evaporator, and an air inlet end of the fan is communicated with an air inlet of the housing; a water tank is mounted at an upper portion of the evaporative water trough, and the water tank is communicated with the evaporative water trough through a water inlet; and an air outlet is provided at an upper portion of the housing, and the air outlet is communicated with an air outlet end of the fan; the stepped evaporator is arranged in an airflow channel between the air outlet and the air outlet end of the fan, and the airflow channel is located between an inner wall of the housing and an outer wall of the water tank.

2. The vertical humidifier according to claim 1, wherein the water tank has a T-shaped longitudinal section, and an upper portion of the water tank is greater than a lower portion of the water tank; an upper portion of the stepped evaporator is mounted around the lower portion of the water tank, and a lower portion of the stepped evaporator is immersed into the evaporative water trough.

3. The vertical humidifier according to claim 1, wherein the stepped evaporator is cylindrical and is mounted around a lower portion of the water tank, and a transverse profile area of an upper portion of the stepped evaporator is greater than a transverse profile area of a lower portion of the stepped evaporator; the stepped evaporator is formed by folding fiber layers, and a folding density of the lower portion of the stepped evaporator is greater than a folding density of the upper portion of the stepped evaporator.

4. The vertical humidifier according to claim 2, wherein the stepped evaporator is cylindrical and is mounted around the lower portion of the water tank, and a transverse profile area of the upper portion of the stepped evaporator is greater than a transverse profile area of the lower portion of the stepped evaporator; the stepped evaporator is formed by folding fiber layers, and a folding density of the lower portion of the stepped evaporator is greater than a folding density of the upper portion of the stepped evaporator.

5. The vertical humidifier according to claim 3, wherein a tapered surface is provided at an inner side of the upper portion of the stepped evaporator, and the tapered surface is matched with the outer wall of the water tank; an annular step surface is provided at an outer side of the lower portion of the stepped evaporator; and the upper portion of the stepped evaporator is clamped at an upper edge of the evaporative water trough.

6. The vertical humidifier according to claim 1, wherein the stepped evaporator is cylindrical and is mounted around the lower portion of the water tank, and a transverse profile area of the upper portion of the stepped evaporator is greater than a transverse profile area of the lower portion of the stepped evaporator; the stepped evaporator is formed by folding fiber layers, and a folding density of the lower portion of the stepped evaporator is greater than a folding density of the upper portion of the stepped evaporator.

7. The vertical humidifier according to claim 1, wherein a valve is mounted in the evaporative water trough, the valve corresponds to the water inlet, and the valve is configured to control a water quantity entering the evaporative water trough from the water inlet.

8. The vertical humidifier according to claim 1, wherein a cover is provided at a top of the housing, the water tank is arranged directly under the cover, and the air outlet is arranged on an outside of an edge of the cover.

9. The vertical humidifier according to claim 1, wherein the fan comprises a blade and a motor, and the motor is drivingly connected to the blade; the motor is arranged above the blade, and the motor is arranged in a cavity protruding upwards at a middle of the evaporative water trough.

10. The vertical humidifier according to claim 1, wherein the water tank, the stepped evaporator, the evaporative water trough and the fan are sequentially mounted in the housing longitudinally, and the water tank, the stepped evaporator, the evaporative water trough and the fan are concentrically arranged and share a common axis.

11. The vertical humidifier according to claim 1, wherein an ultraviolet sterilizing lamp is mounted inside the evaporative water trough.

12. The vertical humidifier according to claim 1, wherein a water heating device is mounted at a lower portion of the evaporative water trough.

13. The vertical humidifier according to claim 6, wherein a water heating device is mounted at a lower portion of the evaporative water trough.

14. The vertical humidifier according to claim 1, wherein the air inlet is arranged at a bottom of the housing; an air heating device is mounted at the bottom of the housing, and the air heating device is arranged between the air inlet and the air outlet end of the fan.

15. The vertical humidifier according to claim 1, wherein a primary filter screen is mounted on the air inlet.

* * * * *